Figure 1:
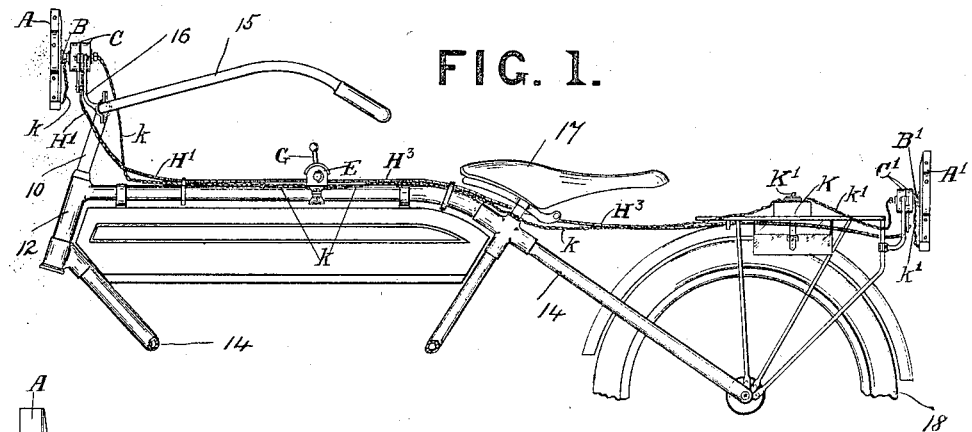

H. FRYMAN.
SIGNALING APPARATUS FOR ROAD VEHICLES.
APPLICATION FILED OCT. 23, 1916.

1,281,551.

Patented Oct. 15, 1918.
2 SHEETS—SHEET 1.

Inventor
Harry Fryman
by Herbert W. Jenner
Attorney

H. FRYMAN.
SIGNALING APPARATUS FOR ROAD VEHICLES.
APPLICATION FILED OCT. 23, 1916.

1,281,551.

Patented Oct. 15, 1918.
2 SHEETS—SHEET 2.

Inventor
Harry Fryman
by Herbert W. Jenner
Attorney

UNITED STATES PATENT OFFICE.

HARRY FRYMAN, OF GREAT GRIMSBY, ENGLAND.

SIGNALING APPARATUS FOR ROAD-VEHICLES.

1,281,551.

Specification of Letters Patent. Patented Oct. 15, 1918.

Application filed October 23, 1916. Serial No. 127,168.

*To all whom it may concern:*

Be it known that I, HARRY FRYMAN, a subject of the King of Great Britain, residing at Great Grimsby, in the county of Lincoln, England, have invented certain new and useful Improvements in Signaling Apparatus for Road-Vehicles; and I do hereby declare the following to be a full, clear, and exact description of the invention, such as will enable others skilled in the art to which it appertains to make and use the same.

This invention relates to that class of direction indicators for motor and other road vehicles, which consists of a pointer or indicating member for indicating the direction in which the vehicle is to travel or whether it is to be brought to a standstill.

In indicators of the kind referred to it has been proposed to operate the pointer or pointers, as the case may be (a pointer or indicating member being in some cases, mounted at both the front and rear of the vehicle) by means of wires of what is known as the "Bowden wire" type, the pointer or pointers which are sometimes in the form of an arrow, sometimes in the form of a device representing a human hand, and sometimes in the form of an electric lamp, being caused to turn to the point indicating the direction the vehicle is to take, by the pulling of the inner wire which causes the rotation of the spindle on which the pointer is mounted, in the required direction, consequent on the wire being connected to such spindle, the pointer being returned on the wire being slackened, by a spring coiled around the spindle and having one of its ends connected to the spindle and the other to a suitable fixture, usually a casing inclosing the spindle.

In some cases the pointer or indicating member is so arranged as to be illuminated by the regulation lamp or lamps with which the vehicle is ordinarily provided, according to another mode it is fitted in a lamp adapted to be rotated by pinion or like gearing under the control of the driver, the pointer being glazed, the glazed portion or portions projecting from the lamp.

The present invention has for its object, improvements in indicating apparatus of the kind referred to, my improvements consisting of so mounting the pointers or indicating members on their spindles that they are evenly balanced thereon whereby there is no unequal weight to be overcome by the operating wires or the like and the springs, as has been the case in previous arrangements in which rotatable pointers have been employed; also a novel construction of pointer or indicating member adapted to be illuminated from the interior when required, and means for carrying the current wires to the lamps for illuminating the pointers or indicating members without such wires interfering with the free movement of such pointers or members when being turned to give the required signal, and of the combination and arrangement of the several parts which constitute the complete indicating apparatus.

My improved indicating apparatus consists of two indicators, as before mentioned, each in the form of an arrow or other distinctive device, the one mounted at the front and the other at the back of the vehicle, the said indicators being adapted to be turned simultaneously in the same direction from the normal position indicating "straight forward," to positions indicating "to the right," "to the left" and "stop," and back to the normal position, the movement of the indicators being effected by a controlling lever mounted in a position to be readily operated by the driver or person in charge of the vehicle, which lever turns spindles on which the indicators are mounted, through the medium of what are known as "Bowden wires" or other suitable flexible connections. One end of each wire or the like being connected to a pulley on a spindle on which the controlling lever is mounted, its other end being connected preferably by a short piece of chain or the like to the spindle of one indicator which spindle projects through a box or casing which contains a clock or like spring for returning the indicator to its normal position on being released after operating, one end of the other wire or the like being connected at one end to a second pulley mounted on the spindle of the controlling lever, the other end of such wire being connected preferably by a piece of chain or the like to the spindle of the second indicator which projects through a second box or casing which contains a clock or like spring for returning such second indicator to its normal position upon being released after operating.

Figure 4:
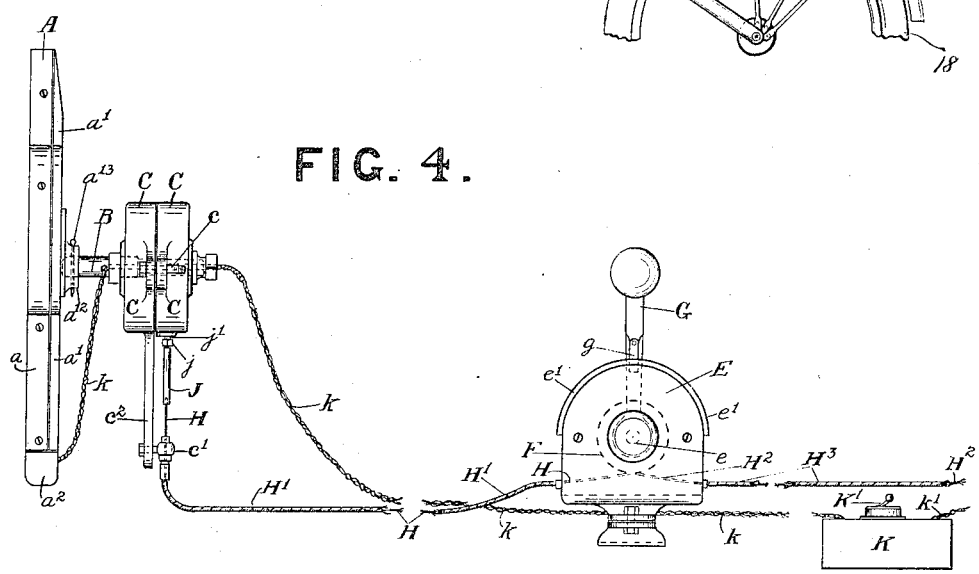
Figure 3:
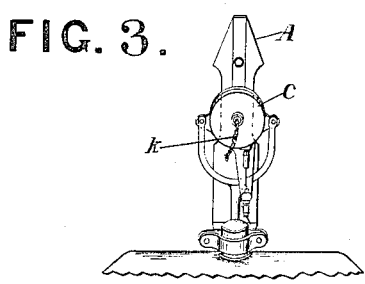
Figure 2:
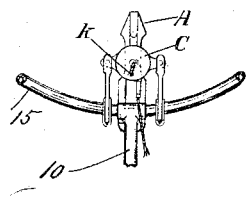
Figure 5:
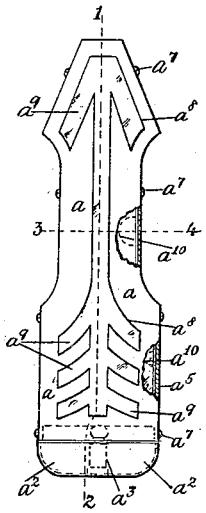
Figure 6:
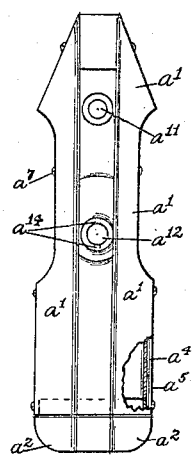
Figures 7, 8:
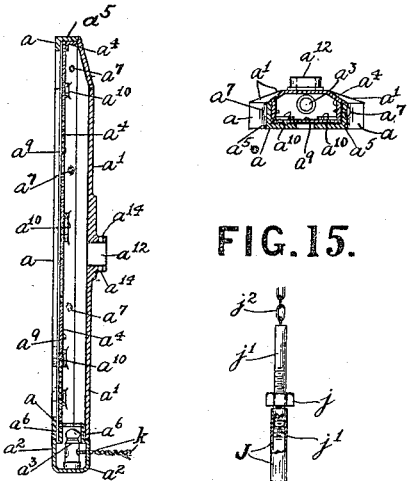
Figure 15:
Figure 9:
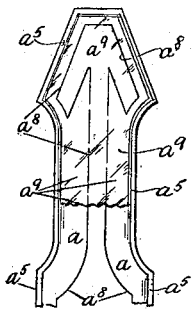
Figure 10:
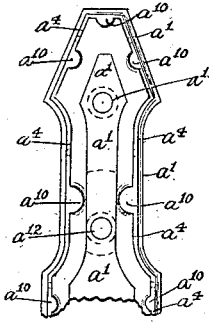
Figures 11, 12:
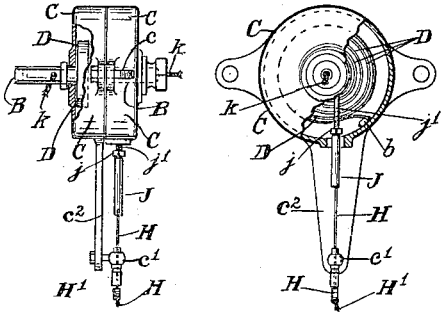
Figures 13, 14:
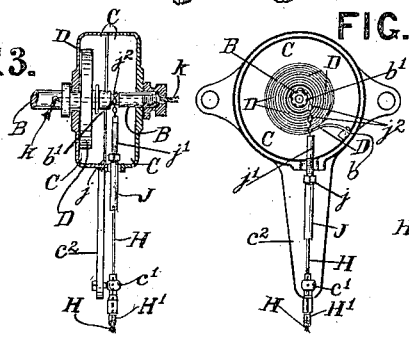
Figures 16, 17:
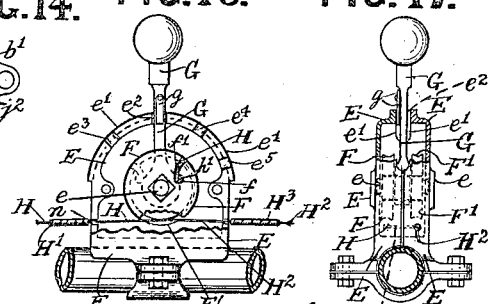

Having thus stated broadly the object and nature of my said invention, I will now proceed to more fully describe the same with the aid of the accompanying two sheets of drawings on which Figure 1 is a side view of a portion of a motor bicycle with my improved indicating apparatus applied. Fig. 2 shows a portion of the handle-bars with the front indicator mounted thereon, Fig. 3 is a view showing one method of mounting the front indicator on the bonnet of a motor road vehicle. Fig. 4 represents a side view of one of the indicators, the box in which the spindle of the indicator has its bearings and which contains the clock or like spring, and also shows the controlling lever, the casing in which is mounted the spindle or fulcrum of such lever with the pulleys thereon, one of the flexible connections shown as a Bowden wire device which connects one pulley on the controlling lever spindle with the spindle of the front indicator and a portion of the corresponding connection for the spindle of the back indicator, the battery for supplying current to the lamps in the indicators and the wires for connecting the battery with the lamp in the front indicator and a portion of the wires for connecting the battery with the lamp in the back indicator. Fig. 5 represents a front view of one of the indicators, partly in section, Fig. 6 a back view of the same partly in section, Fig. 7 a section on the line 1—2 of Fig. 5, Fig. 8 a section on the line 3—4 of Fig. 5, Fig. 9 an inside view of a portion of the front portion of one of the indicators showing a portion of the glass or other transparent material to form the backing for the representation of an arrow or like device cut or stamped out of the front portion, Fig. 10 is an inside view of a portion of the back portion of one of the indicators, Fig. 11 is an end view of one of the boxes or casings in which the spindle of one of the indicators is mounted, the box or casing being shown partly in section to allow of the coiled spring therein being seen, Fig. 12 is a side view of same partly in section showing the spring in expansion, Fig. 13 is a transverse sectional view of same, Fig. 14 is a side view with the near side of the casing removed and showing the spring in compression. Fig. 15 is an elevation partly in section of a device for adjusting the Bowden wire device or other connection between an indicator spindle and a pulley on the spindle of the controlling lever. Fig. 16 is a side view of the casing or frame in which the controlling lever is mounted, the pulleys on the fulcrum or spindle of such lever and a portion of each of the Bowden wire devices or the like connected to such pulleys and to the indicator spindles, a portion of the near side of the casing being broken away, and Fig. 17 is an end view of same partly in section. Figs. 2 to 17 inclusive are drawn to a larger scale than Fig. 1.

Referring to the drawings, A and $A^1$ are two indicators each having the shape approximately of an arrow. The indicator A is fixedly mounted on one end of a spindle B which passes through the center axially of a box or casing C built up of two similarly shaped portions secured together by bolts $c$ or equivalent means, the indicator $A^1$ being similarly mounted on one end of a spindle $B^1$ which passes through the center of a second box or casing $C^1$ also built up of two portions secured together, one box or casing with its indicator being mounted at the front and the other at the back of the vehicle on suitable brackets or supports in such a way as to allow of the front indicator being distinctly perceptible to pedestrians and others in advance of the vehicle and of the back indicator being similarly perceptible to pedestrians and others following the vehicle. In each box or casing C, $C^1$ is mounted a clock or other suitable coiled spring D the inner end of which is hooked on to a hook or lip on the spindle on which the indicator is mounted, or is secured by a screw or other suitable means to such spindle, the outer end of such spring being secured to the inside of one portion of the box or casing as indicated at $b$ in Figs. 12 and 14 of the drawings, the spring in one box or casing being coiled around the spindle in the opposite direction to that in which the spring in the other box or casing is coiled around the spindle mounted in such second box or casing.

Between the front and rear indicators is a casing or frame E built up of two similarly shaped portions suitably secured together, in which casing is mounted a spindle $e$ on which are fixedly mounted two pulleys F and $F^1$ and a lever G, the spindle acting as the fulcrum for the lever, the top of the box or casing having a slot-hole or opening $e^1$ of a suitable length for the lever G to pass through and for it to work in, four recesses $e^2$, $e^3$, $e^4$, $e^5$ being provided in the metal at one side of the slot-hole or opening at the points to which the lever has to set the indicators A and $A^1$ in the positions in which they have to point to indicate the direction the vehicle is going to take, or if it is going to be brought to a standstill, the recess $e^2$ being the one in which the lever rests when the indicators are in their normal position, that is, pointing upwardly to indicate that the vehicle will proceed straight ahead, $e^3$ the one to which the lever is moved when the indicators are to indicate that the vehicle is to be turned to the left, $e^4$ the one to which the lever is moved when the indicators are to indicate that the vehicle is to be turned to the right, and $e^5$ the one to which the lever is moved when the indicators are to indicate that the vehicle is going to be brought to a standstill.

The lever is provided at one side with a spring $g$ which is in contact with the side of the slot-hole $e^1$ which is not provided with recesses, said spring serving to press the lever G into the recess to which it is moved and to hold it therein, the lever being capable of a certain amount of lateral movement to allow of this.

One of the pulleys on the spindle $e$ in the casing E is connected with the spindle B of the indicator A by a chain, wire or other suitable flexible connection, a Bowden-wire device being the form of connection shown in the accompanying drawings, the other pulley on the said spindle $e$ being connected with the spindle of the indicator $A^1$ by a similar device, the method of making the connection being the same in each case and consisting according to a convenient mode, describing the connection between the pulley F in the casing E and the spindle B of the front indicator A by way of example, in providing one end of the inner or stranded wire H of the device with a knot $h^1$, or with an enlargement of any suitable kind to fit in a hole $f$ in one side of the pulley F, the hole being connected with the groove of the pulley by a cut $f^1$ slightly wider than the thickness of the wire, the wire being given a part of a turn, or more than a part of a turn around the pulley and being led through a hole in the front end of the box or casing E and thence up through a nipple or short tube $c^1$ mounted on a depending portion $c^2$ of the casing C in which is mounted the spindle B on which is mounted the indicator A, the end of the wire being movably connected to an adjusting device consisting of a tube J (see Fig. 15) provided with flats or a nut-like head to enable it to be rotated, into which tube is screwed a threaded rod $j^1$ on which may be mounted a locking nut $j$, to the top of which rod $j^1$ is connected a short piece of chain or the equivalent $j^2$ which is hooked on to or otherwise secured to the center of the spindle B around which the chain or the like $j^2$ is given a part of a turn, or more than a part of a turn, the spindle preferably having an annular recess $b^1$ in it, to take the portion of chain or the like, one end of the spiral inclosing wire $H^1$ with its cover abutting on that end of the casing E through which the wire H passes, the other end abutting on the bottom of the nipple or tube $c^1$ on the portion $c^2$ of the casing C, thereby protecting practically the whole of the wire H. The wires H and $H^2$ are slipped into cross slots $n$ in the frame E, as shown in Figs. 16 and 17.

One end of the inner wire $H^2$ of the second Bowden-wire device which connects the pulley $F^1$ with the spindle $B^1$ of the indicator $A^1$, is given a part of a turn, or more than a part of a turn around the pulley $F^1$ in the opposite direction to that in which the corresponding end of the corresponding wire is turned on the pulley F, and the chain or the like device connected to the adjusting device of such wire is given a part of a turn, or more than a part of a turn around the spindle $B^1$ of the indicator $A^1$ in the opposite direction to that in which the corresponding chain or the like $j^2$ runs around the spindle B of the indicator A, whereby when the lever G is moved to the point to turn the indicators A and $A^1$ to the required position, both indicators are caused to move in the same direction and to the same point. This mechanism is more particularly adapted for use on bicycles, tricycles, and similar vehicles in which the rider can only exert a limited amount of hand power, and in which the front signal device is carried by the pivoted steering spindle and moves pivotally with it.

This mechanism is shown applied to a bicycle, in which 10 is the steering spindle at the front end, which spindle is pivoted in the head 12 on the frame 14. The handle bar 15 is secured to the top of the spindle 10, and the casing C is secured to the handle bar by brackets 16. The casing E of the controlling device, provided with the operating handle G, is secured to the frame 14 between the steering head 12 and the saddle 17, so that the handle can be operated by one hand while the rider retains hold of the handle bar with the other hand and maintains his balance. The casing $C^1$ is rigidly secured to the frame 14, and is arranged to the rear of the hind wheel 18.

The spindles B and $B^1$ of the indicator pointers are arranged horizontally and longitudinally of the bicycle and each other, and the spindle $e$ of the operating handle G is arranged crosswise of the bicycle and the axes of the spindles of the indicator pointers. The flexible operating connections or Bowden wires, and the flexible conductors, permit the frame to spring under the jars of a rough road, and permit the steering spindle to be operated, without affecting the action of the direction indicators. The pulleys which operate the flexible connections or Bowden wires are much larger in diameter than the indicator shafts on which the outer end portions of the flexible connections are wound, so that only a short handle is required to operate the pointers, and but little hand power is required.

The indicators are, as before mentioned, each preferably of the shape of an arrow and adapted to be illuminated at night and in dull weather, a convenient way of constructing such indicators being to cast, stamp or otherwise form them out of some light metal such as aluminium, in three or other suitable number of pieces adapted to be assembled and secured together.

The indicator illustrated in detail at Figs. 5 to 10 inclusive of the drawings is shown built up of three portions, a front portion $a$, a back portion $a^1$, and a bottom portion $a^2$, the latter having a small electric lamp $a^3$ fitted inside it. The front and back portions have each a flange around the sides and top, the flange $a^4$ on the back portion being adapted to fit within the flange $a^5$ on the front portion, the bottom portion $a^2$ having a reduced portion $a^6$ adapted to fit in the open bottom of the two portions $a$ and $a^1$, the whole being secured together by screws or the like $a^7$. The front portion $a$ has the representation of an arrow $a^8$ cut or stamped out of it, and inside such portion may be fitted a piece of glass, celluloid or other transparent or semi-transparent material $a^9$ of any suitable color, red by preference, which would form a backing for the cut or stamped out device and which would show at night or in dull weather when the indicator is illuminated by means of the electric lamp. The back portion of the indicator is preferably beveled as shown more clearly at Fig. 10, the beveled portions being adapted to deflect the light from the electric lamp on to the piece of glass or the like $a^9$, and such back portion may have stud-like portions $a^{10}$ to bear on the piece of glass or the like to hold it in position, and it may also be provided with a hole $a^{11}$, if desired, through which the light from the lamp could be seen when the indicator is required to be illuminated, so that should the lamp fail the fact would be quickly detected.

A convenient method of mounting the indicators on their spindles is to provide the back of the indicator with a hollow boss $a^{12}$ at the center of its length and width to receive the end of the spindle, and to pass a split or other suitable pin $a^{13}$ through holes $a^{14}$ in the said boss and through a corresponding hole in the end of the spindle, but any other suitable method of mounting such indicators may be employed.

An electric battery K or the equivalent is employed for supplying the electric current to the lamps in the indicators, said battery or the like being situated in a position for the switch $K^1$ to be within easy reach of the rider or driver of the vehicle, the wires $k, k^1$ which connect the battery or the like with the lamps being led through the spindles of the indicators which are hollow for a suitable portion of their length to allow of this, and out through a hole in one side of such spindles and thence to the lamps, this leading of the wires through the spindles of the indicators enabling such indicators to be turned freely to any of the necessary positions without the movement being interfered with by the wires. This construction also permits the indicators or pointers to be removed and replaced on their shafts without breaking the light wires or interfering with the circuit.

The normal position of the indicators is vertical with the point upward, this indicating that the vehicle is to proceed straight forward, the controlling lever when the indicators are in this position being also vertical. When it is required to turn the indicators to the position to indicate that the vehicle is going to turn to the left or to the right, or is going to stop, the controlling lever is moved to the recess $e^3$, $e^4$ or $e^5$, as the case may be, the moving of the lever imparting a part of a rotation to the spindle or fulcrum of such lever and consequently to the two pulleys mounted thereon, which exerts a pull on the wire or the like which connects one of such pulleys with the spindle of one of the indicators and slackens the wire or the like which connects the other pulley on the lever spindle with the spindle of the other indicator, the one indicator being turned by the pull exerted by the one wire or the like on its spindle which imparts a part of a rotation to such spindle, the other indicator being turned by the pull of the clock or like spring wound on its spindle consequent on the slackening of the wire or the like which connects such spindle with the other pulley on the spindle or fulcrum of the controlling lever, which spring by expanding imparts a part of a rotation to such spindle, the spring on one spindle being put into compression at the same time as the spring on the other spindle expands, with the result that when the spring on one spindle is in compression the spring on the other spindle is in expansion, consequently whichever way the controlling lever is moved, the pull is against the tension of one spring only, the other spring by expanding not only rotating the spindle on which it is mounted to conform to the direction of the spindle which is being turned by the pull of a wire or the like, but reducing the pressure required to move the controlling lever. When the lever is moved to the position, say for example, to return the indicators to their normal position, the pull of the wire which connects one pulley on the spindle or fulcrum of the controlling lever with the spindle of one of the indicators, turns that indicator, and the expanding of the spring on the spindle of the other indicator consequent on the slackening of the wire which connects such spindle with the other pulley on the spindle or fulcrum of the controlling lever, simultaneously turns such second indicator to its normal position.

I claim:—

1. In a direction indicator, a support, a hollow pointer comprising separable front and back portions having flanges extending around their edges and slidable telescopically one within the other, the front portion having an elongated light opening, and the back portion having converging light reflecting surfaces extending along its sides adjacent to its flange and arranged opposite the imperforate part of the front portion, fastening devices normally securing the front and back portions together, a source of light arranged within the hollow pointer, and means for pivotally connecting the pointer with the said support.

2. In a direction indicator, a support, a hollow pointer comprising separable front and back portions having flanges extending around their edges and slidable telescopically one within the other, the front portion having an elongated light opening, and the back portion having converging light reflecting surfaces extending along its sides adjacent to its flange and arranged opposite the imperforate part of the front portion, fastening devices normally securing the front and back portions together, a removable end piece having a reduced portion adapted to fit in one end of the hollow pointer between its front and back portions, a source of light secured in the said end piece, and means for pivotally connecting the pointer with the said support.

In testimony whereof I affix my signature, in presence of two witnesses.

HARRY FRYMAN.

Witnesses:
LOUIS EDGAR KIPPAX,
FRED. HAROLD RHODES.

Copies of this patent may be obtained for five cents each, by addressing the "Commissioner of Patents, Washington, D. C."